Sept. 21, 1943.   S. W. SHAW   2,330,085
TRACTION WHEEL
Filed May 1, 1942   2 Sheets-Sheet 1

Inventor
Stanley Wilbur Shaw

By Clarence A. O'Brien
and Harvey B. Jacobson, Attorneys

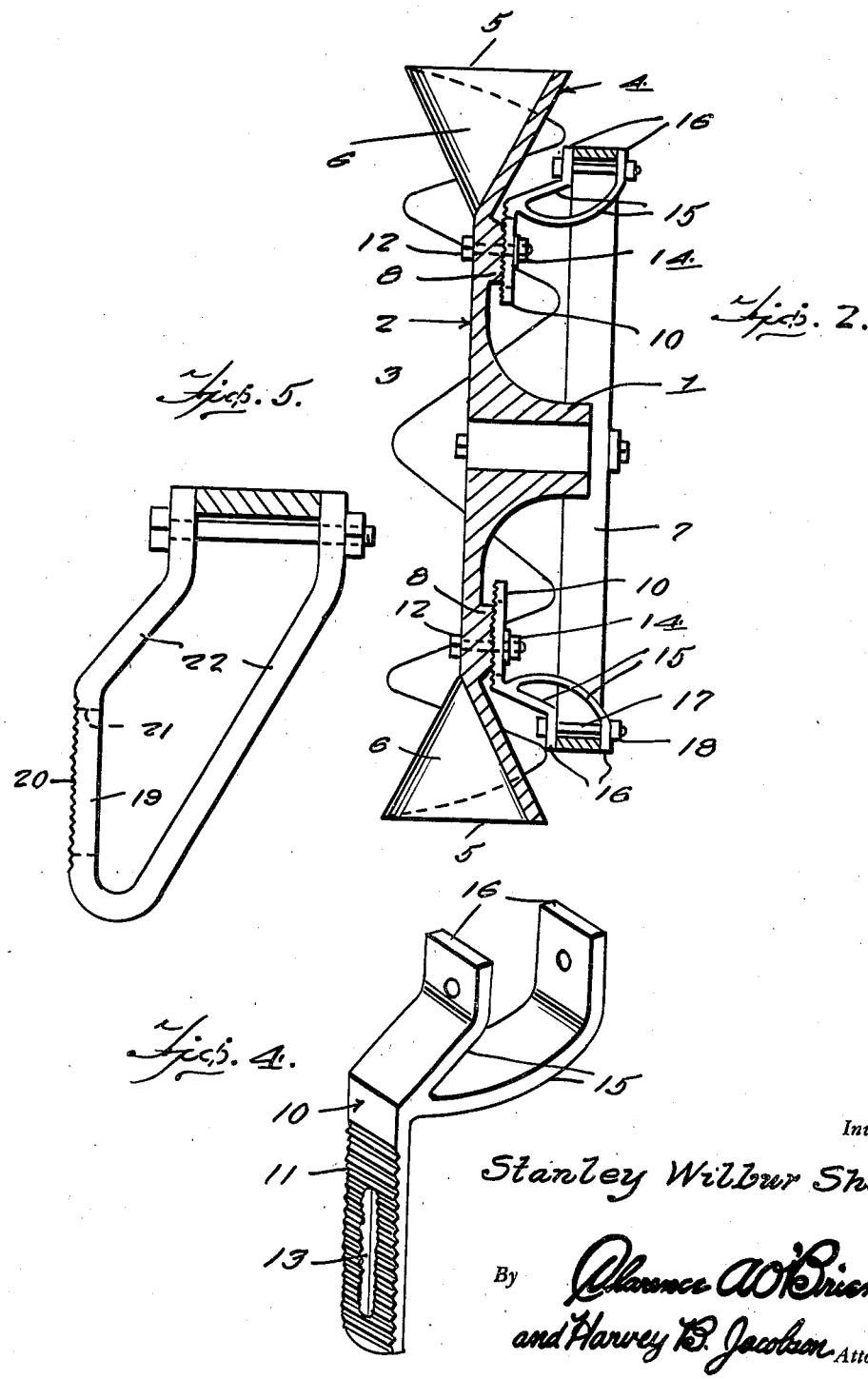

Patented Sept. 21, 1943

2,330,085

UNITED STATES PATENT OFFICE 2,330,085

TRACTION WHEEL

Stanley Wilbur Shaw, Galesburg, Kans.

Application May 1, 1942, Serial No. 441,327

1 Claim. (Cl. 301—41)

My invention relates to improvements in traction wheels for tractors, agricultural machines, and the like.

My invention is designed with the particular objects in view of providing a traction wheel involving few parts, of simple inexpensive construction, and which is proof against skidding and side slip, and is convertible easily and quickly for use on hard surface roads into a smooth tread wheel, so that in travel over such, or other surfaces, no damage will result in the use of the wheel.

Other, and subordinate, objects are also comprehended by my invention, all of which, together with the precise nature of my improvements, will be readily understood when the succeeding description and claim are read with reference to the drawings accompanying and forming part of this specification.

Figure 1:
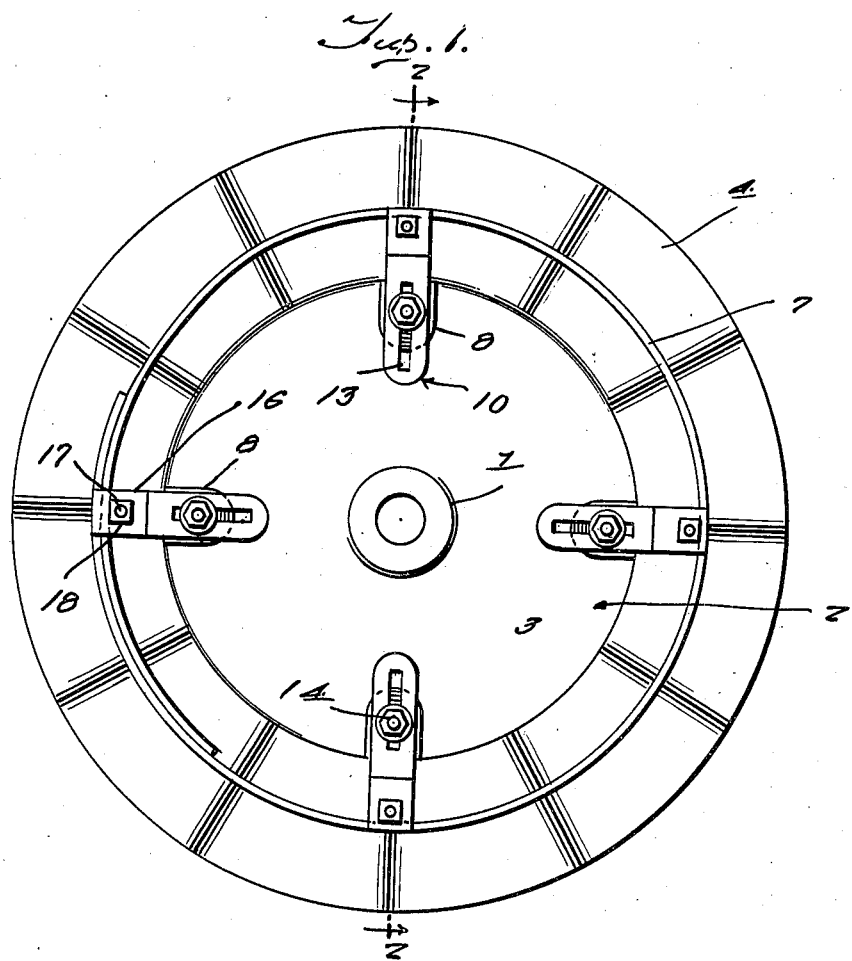
Figure 3:
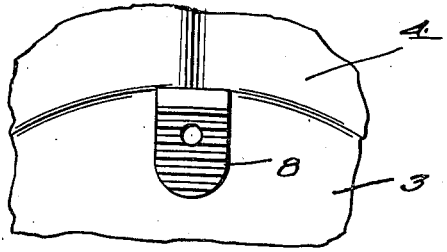

In said drawings:

Figure 1 is a view in front elevation of my improved traction wheel in its preferred embodiment, Figure 2 is a view in diametrical section, Figure 3 is a fragmentary view in side elevation, Figure 4 is a view in perspective of one of the brackets, and Figure 5 is a view in edge elevation of a modified form of bracket.

Reference being had to the drawings by numerals, my improved traction wheel, in its prefered embodiment, comprises a hub 1 extending from one side of a one-piece web 2 including a plate-like body portion 3 and a rim portion 4 of serpentine form circumferentially of said rim and forming ground gripping and penetrating grouts 5 zigzagging crosswise of the median plane of the body portion 3, and pockets 6 in said rim portion 4 flaring outwardly in the plane of the body portion 3 and opening onto opposite sides of the rim portion 4 alternately.

As will be clear, the described grouts 5 dig into the ground to provide maximum traction and together with the pockets 6 positively preclude side slipping of the wheel.

An expansible and contractible auxiliary ground engaging tread member 7 is mounted on the described web 2 on the outboard side thereof and which has the form of a flat metal, resilient, split ring spaced laterally from the rim portion 4 sufficiently so that it may be expanded outwardly beyond said portion to roll on the ground alongside the same.

The mounting for the tread member 7 comprises radial bosses 8 on the outboard side of the web 2 adjacent the juncture of said web with the rim portion 4 and spaced around said web in 90 degree angular relation opposite pockets 6 on the same side of the rim portion 4 for a purpose presently apparent. The bosses 8 are serrated transversely as at 9. Each boss 8 has clamped thereto a bracket 10 comprising a bar-like transversely serrated and longitudinally slotted shank 11 clamped to the boss 8 by a bolt 12 extending through the web 2, boss 8 and the slot 13 of said shank and equipped with a neck 14. Each bracket 10 is provided with a forked laterally extending outer end 15 terminating in laterally spaced, concaved, flexible clamping ends 16 adapted to straddle the tread member 7 edgewise and to be clamped against the same by a bolt and nut 17, 18 extending through said end 15 on the inner side of the tread member 7.

The modified form of bracket shown in Figure 5 has the form of a clip with a straight side portion 19 serrated, as at 20, and longitudinally slotted, as indicated by dotted lines at 21 for bolting to one of the bosses 8. Extending from the portion 8 laterally and obliquely is a pair of bracket arms 22 equipped at their outer ends in the same manner as described with reference to the bracket 10 for clamping the tread member 7 therebetween.

In the normal use of the described wheel, the tread member is contracted into an idle position by adjusting the brackets 10 inwardly on the bosses 8, lapping the ends of the member 7 one over the other and clamping the ends 16 of the brackets 10 against opposite side edges of said member 7 with the lapped ends of said member interposed between the ends 16 of one of said brackets. When it is desired to use the tread member 7, and thereby disable the grouts 5, the brackets 10 are adjusted outwardly and the member 7 expanded into the proper diameter and clamped between the ends 16 of said brackets 10 with the ends of the member 7 abutting and clamped between ends 16 of one of said brackets.

The tread member 7 may be adjusted to expand the same for use as a depth gauge to vary the degree of penetration of the grouts in the ground in a manner which will be readily apparent.

The foregoing will, it is believed, suffice to impart a clear understanding of my invention without further explanation.

Manifestly, the invention, as described, is susceptible of modification in other respects than as herein set forth and without departing from the inventive concept, and right is herein reserved to such other modifications also falling within the scope of the appended claim.

What I claim is:

A traction wheel comprising a one-piece hub and web, the latter including a rim portion and a one-piece transversely slit tread member mounted on one side of said web and expansible into circular form and greater diameter than said rim portion to lift the latter off the ground, and means to mount said member on said web, comprising brackets including bar-like shanks radially slidable on said web into different set positions, and having terminal forked clamps extending laterally and obliquely therefrom and spanning said member from the inner circumferential side thereof.

STANLEY WILBUR SHAW.